United States Patent [19]

Updike, Jr. et al.

[11] Patent Number: 4,704,063

[45] Date of Patent: Nov. 3, 1987

[54] CONTAINER LOADING AND UNLOADING APPARATUS

[76] Inventors: Elbert B. Updike, Jr., 1705 General Longstreet Ave., Culpeper, Va. 22701; Bruce E. Updike, Rte. 4, Box 215, Nathalie, Va. 24577

[21] Appl. No.: 864,724

[22] Filed: May 19, 1986

Related U.S. Application Data

[63] Continuation-in-part of Ser. No. 720,358, Apr. 5, 1985.

[51] Int. Cl.⁴ .............................................. B65G 67/02
[52] U.S. Cl. .................................... 414/500; 414/679; 414/494
[58] Field of Search ............... 414/679, 499, 786, 349, 414/350, 351, 352, 353, 467, 469, 480, 488, 491, 492, 493, 494, 498, 500, 538, 559, 569, 571; 294/82.2, 82.1, 67.1, 88; 410/65

[56] References Cited

U.S. PATENT DOCUMENTS

| | | | |
|---|---|---|---|
| 3,107,020 | 10/1963 | Dempster et al. | 414/499 X |
| 3,214,046 | 10/1965 | Dempster et al. | 414/499 X |
| 3,231,120 | 1/1966 | Dempster et al. | 414/499 X |
| 3,254,875 | 6/1966 | Dempster et al. | 414/499 X |
| 3,272,546 | 9/1966 | Cooley | 414/499 X |
| 3,302,808 | 2/1967 | Herpich et al. | 414/499 X |
| 3,399,795 | 9/1968 | Clucuer et al. | 414/500 |
| 4,409,903 | 10/1983 | Wilhelmsson et al. | 414/679 X |

FOREIGN PATENT DOCUMENTS 1543515 9/1968 France .................................. 414/498

*Primary Examiner*—Frank E. Werner
*Attorney, Agent, or Firm*—Russell J. Egan

[57] ABSTRACT

A method and apparatus for positively loading and unloading containers onto and off of a truck without relying upon gravity includes an assembly driven longitudinally of the load carrying portion of the truck, actuator means responsive to driver commands, and a latching means carried by the assembly and responsive to the actuator means to cause latching/locking engagement with a container. The container is positively controlled and therefore can be either moved up and down an inclined load carrying portion of the truck or a horizontally disposed load carrying portion.

11 Claims, 10 Drawing Figures

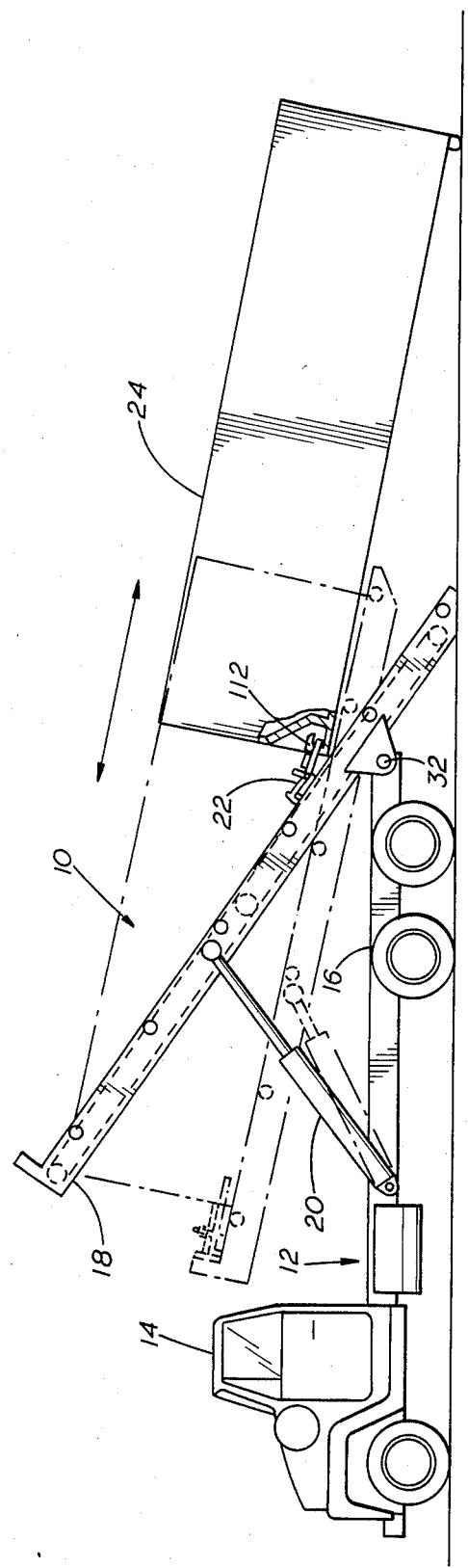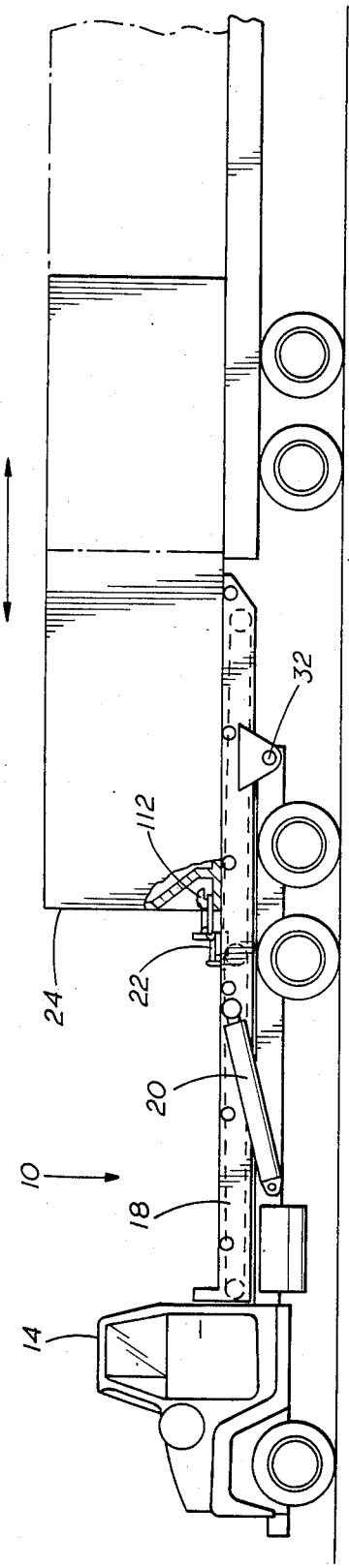
FIG.2
FIG.3

CONTAINER LOADING AND UNLOADING APPARATUS

CROSS REFERENCE TO RELATED APPLICATION

The present application is a continuation-in-part of our application Serial No. 720,358 filed Apr. 5, 1985.

BACKGROUND OF THE INVENTION

1. Field of the Invention

The present invention relates to a method and apparatus for loading and unloading containers onto and off of the rear bed of a truck without requiring the driver to dismount from the cab.

2. Description of the Prior Art

The present state of hauling loads via trucks has developed to the point where containers, which are preloaded at a site, are displaceably mounted on the rear bed of a truck for transport. This technique has many advantages, most of which are economic, in that the truck is not tied up during loading of the container and the number of people involved in the loading operation can be reduced. The principles involved in this type of hauling apply equally to raw materials, finished goods and refuse.

Tractor trailer combinations are an example of the type of vehicle designed for the above concept. It is quite evident from the highways that this form of trucking is in wide use. However, the tractor trailer or "semi" does not satisfy all hauling conditions. For example, trash is commonly collected in large containers kept at fixed locations and periodically unloaded into containers fixed to a truck. The trucks currently available for this type of work have several drawbacks, including the requirement for help, in addition to the driver, and the inevitable spillage on site. Also, these trucks are limited as to the size container they can handle and/or the operating equipment as potential safety hazards, such as free falling containers during unloading. Most of the available trucks simply release the container and allow gravity to do the unloading, with the truck pulling out from under the partially unloaded container. This naturally causes a great deal of unnecessary noise and, in the case of finished product, could cause damage to the items being transported. Further, since the prior trucks have used gravity as the unloading force, it is substantially impossible to unload the container onto a dock or trailer which is at the same height as the bed of the truck. Likewise, the trucks to date have not been capable of loading a container from a dock, trailer or the like, which is at the height of the truck bed.

Examples of the prior trucks and loading assemblies can be found in U.S. Pat. Nos. 3,077,278; 3,144,149; 3,857,504; 3,894,644 and 4,165,007.

SUMMARY OF THE INVENTION

The present invention overcomes the above-described difficulties in the prior art by providing a truck having a chassis with a load-carrying rear bed including a power-driven, rearwardly directed dumping portion and an operator control assembly to positively load and unload at least one container onto and off of the dumping portion. The loading assembly can be operated by fluid, cable, gear or screw drive means independent of the dumping portion and is controlled by the driver from the cab. The unloading assembly includes a latching mechanism which is driven to positively engage a container and drive it with respect to the dumping portion in a controlled manner.

BRIEF DESCRIPTION OF THE DRAWINGS

An embodiment of the present invention will now be described by way of example with reference to the accompanying drawings in which:

FIG. 2 is a side elevation of the truck of FIG. 1 showing loading/unloading a container from the ground;

FIG. 3 is a side elevation similar to FIG. 2 showing loading/unloading of a container onto or off of an equal height structure, such as a trailer;

DETAILED DESCRIPTION OF THE PREFERRED EMBODIMENT

Figure 1:
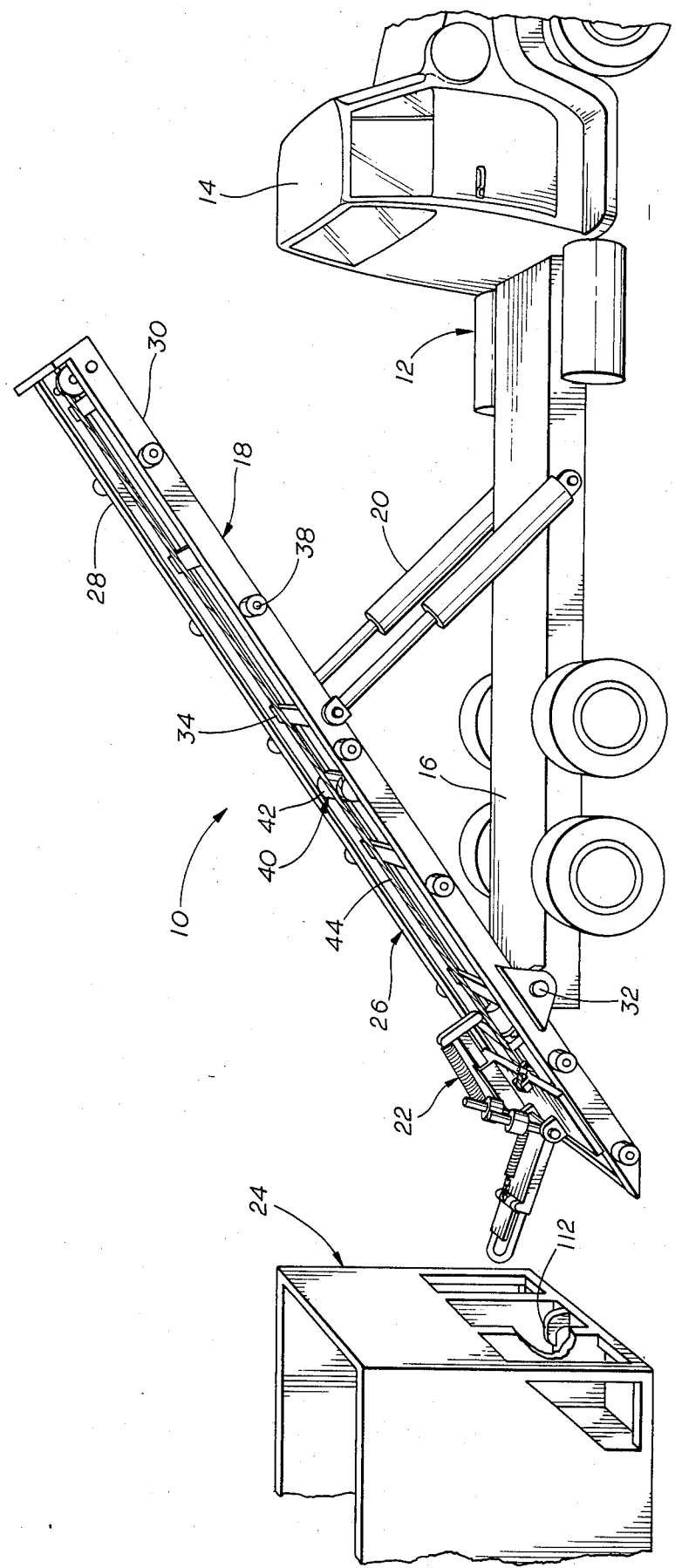
FIG. 1 is a diagrammatic view of a truck embodying the present invention.

The present invention is shown incorporated into a truck 10. The truck is of rather conventional structure having a chassis 12 with a cab 14 on the forward end and a load carrying rear end 16 provided with a rearwardly directed dumping assembly 18 actuated by a first drive means 20 and carrying the subject latching and loading assembly 22. The assembly 22 is adapted to engage a container 24 and to positively secure the container while it is being loaded onto and off of the truck 10, as will be explained below.

The dumping assembly 18 is fairly conventional in that it includes a frame 26 formed by a pair of parallel spaced side rails 28, 30 of [-, I- or T-section rotatably attached to the rear of the chassis by pivots 32. The side rails are held in parallel spaced relationship by a plurality of fixed, parallel spaced cross bars 34. Each side rail is provided with an array of freely rotating rollers 38 spaced along the sides thereof, the axes of the rollers being parallel and also normal to the axis of the respective side rail. Each roller 38 is also positioned so that it projects slightly above the side rail to assist in moving the container 24 along the dumping assembly 18. The frame 26 is driven between the raised dump position (FIGS. 1 and 2) and the lowered travel position (FIG. 3) by means of first drive means 20 which can be any known means, such as the hydraulic piston and cylinder assemblies shown. The ends of the piston and cylinder assemblies 20 are rotatably connected to both the chassis 12 and the side rails 28, 30. A second drive means 40, here shown as a winch 42 and cable 44, is mounted on the frame 26 with the cable extending in general parallel spaced relationship between the side rails 28, 30 to drive the latching mechanism 22 therealong. It is to be understood that other second drive means, such as fluidic, gear, or screw drives, could be substituted for the cable and winch mechanism illustrated.

Figure 4:
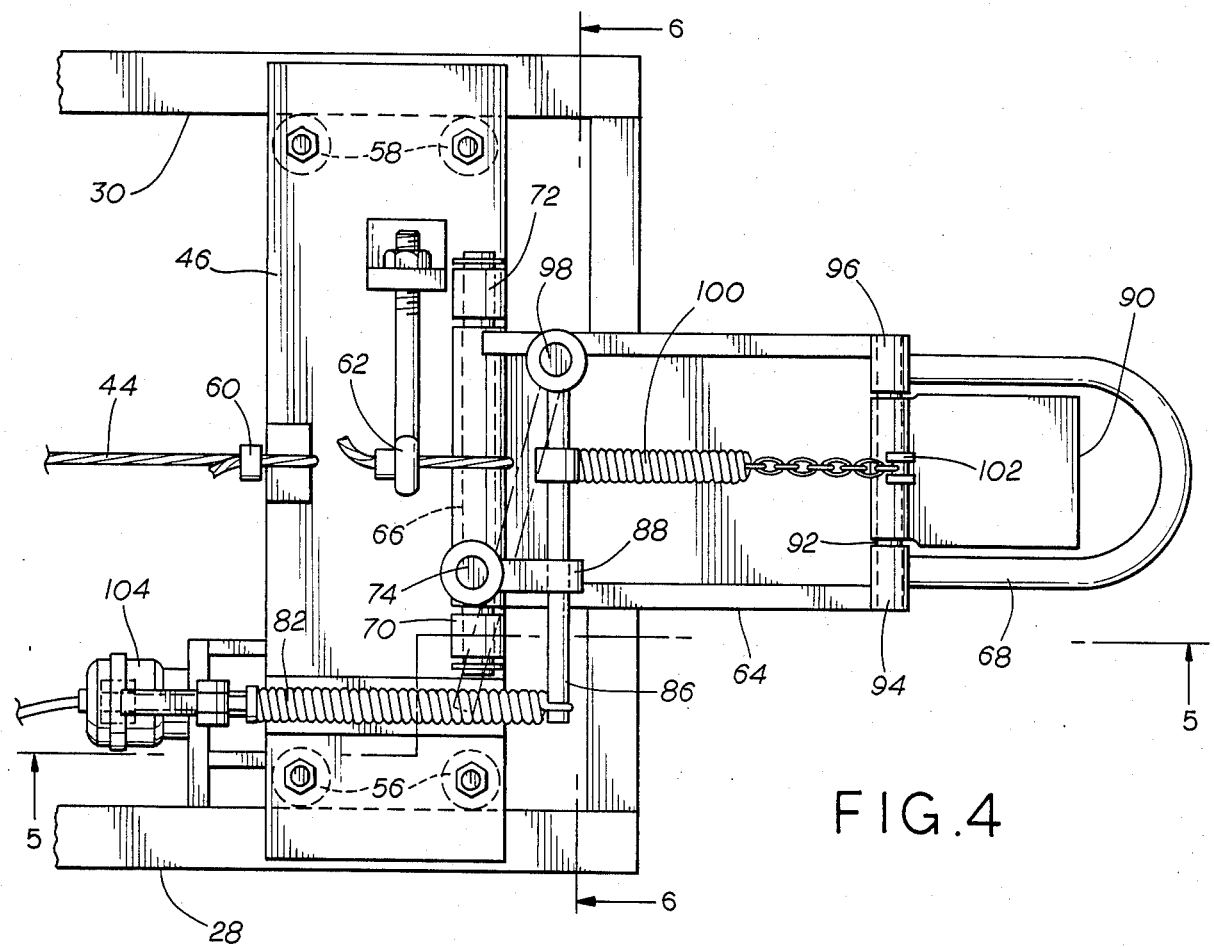
FIG. 4 is a plan view of the latching mechanism of the present invention.
Figure 5:
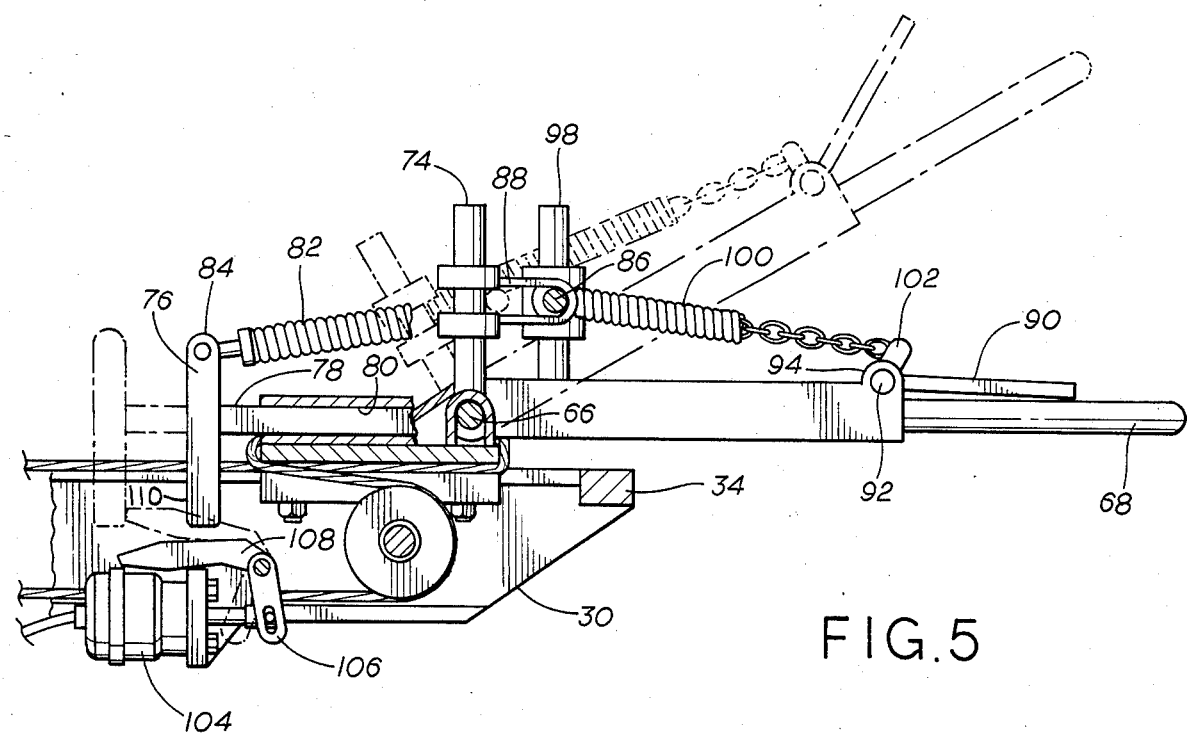
FIG. 5 is a section taken along line 5—5 of FIG. 4.
Figure 6:
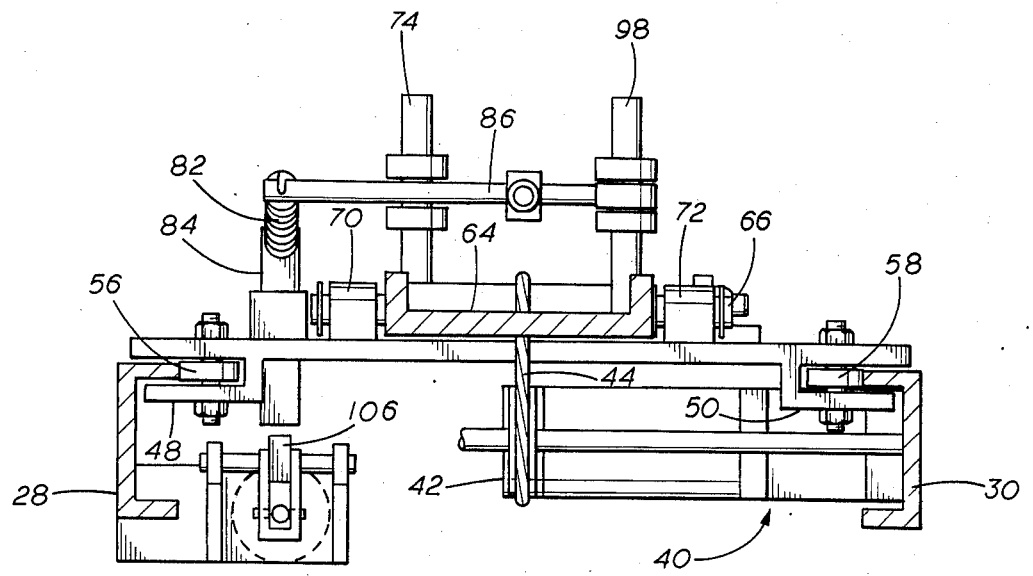
FIG. 6 is a section taken along line 6—6 of FIG. 4.

The latching mechanism 22 can best be understood from FIGS. 4, 5 and 6. The latching mechanism 22 includes a plate-like base fixture 46 having, on the lower side thereof, a pair of flanges 48, 50 defining outwardly directed channels 52, 54 each of which contains a pair of rollers 56, 58 engaging a flange portion of a respective side rail 28, 30. The fixture 46 includes first and second cable attachment means 60, 62 for securing ends of the cable 44 to form, effectively, an endless loop. At least one of the cable attachment means 60, 62 is arranged to provide adjustment so as to take up any slack which may develop in the cable 44. An elongated flat latch assembly 64 has an axle 66 extending transversely across one end and a closed, U-shaped frame 68 at the opposite end. The ends of axle 66 are received in brackets 70, 72 on fixture 46 for rotatable movement of assembly 64 with respect to fixture 46. A first stud 74 is fixed extending normal to the surface of the assembly 64 toward one end of the axle 66. A T-shaped actuator 76 has its elongated member 78 extending into passageway 80 on the fixture 46. One end of helical spring 82 is attached to end 84 of the actuator crossbar and the other end of spring 82 is attached to a crossbar 86 loosely carried by bracket 88 on the stud 74. A locking plate 90 has a pivot pin 92 extending across one end thereof with the ends of the pivot pin received in brackets 94, 96 so that the locking plate 90 can rotate with respect to the U-shaped frame 68. A second stud 98 is pivotally mounted extending normal to the surface of the latch assembly 64 spaced from first stud 74, and fixedly carries the opposite end of crossbar 86. A second spring 100 is connected between the crossbar 86 and a lever arm 102 on the lock plate 90 and pivot pin 92. An actuator piston assembly 104 is mounted on side rail 28 beneath the path of travel of the fixture 46 and has a linkage assembly 106 connected thereto so that arm 108 can be moved into and out of alignment with end 110 of the crossbar of the T-shaped actuator 76.

The container 24 is provided with a conventional latch hook 112 at one end thereof and needs no modification to be used in conjunction with the present invention. In fact, the present invention is capable of handling most any container provided with a hook and needs no special design.

Figure 7:
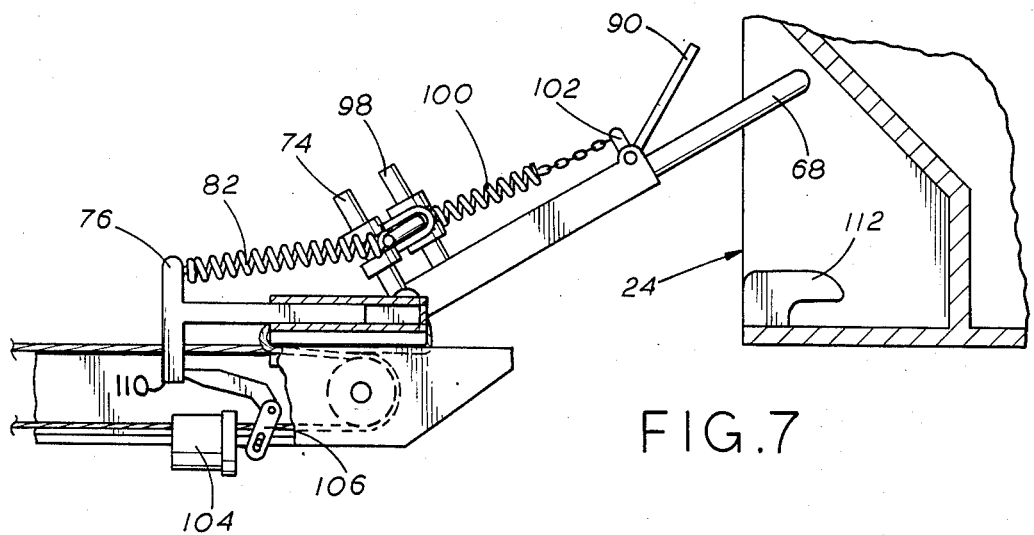
FIG. 7 is a side elevation, partly in section, showing the subject latching mechanism at the start of a latching operation.
Figure 8:
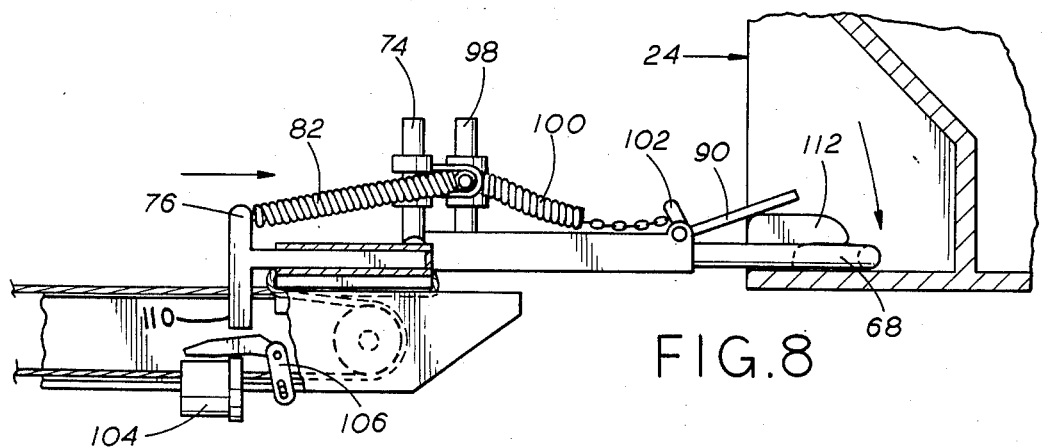
FIG. 8 is a side elevation similar to FIG. 7 showing an intermediate step in the latching operation.
Figure 9:
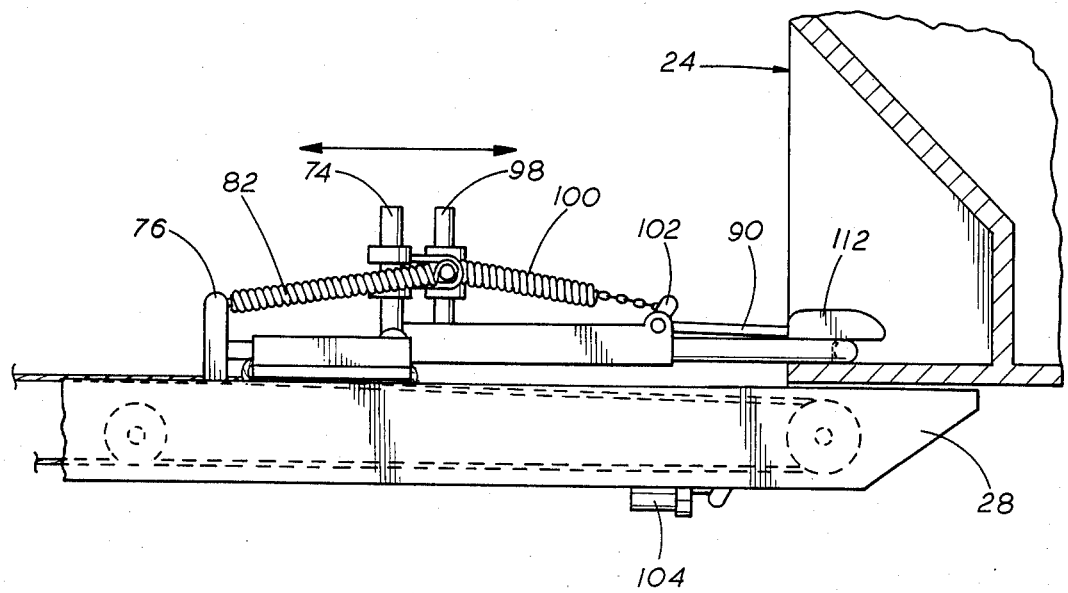
FIG. 9 is a side elevation similar to FIGS. 7 and 8 showing the end of the latching operation.

In operation, the container 24 is loaded on the truck 10 by first raising the dump assembly 18 to the position shown in FIG. 1. The truck 10 is then driven backward in alignment with the container 24 to bring the latching loading assembly 22 into position with respect to the hook 112. The drive then actuates the piston assembly 104 to release the linkage 106 allowing the actuator 76 to move under the action of the spring 82. This allows the latch assembly 64 to move from the position shown in FIGS. 1 and 7 (and in phantom in FIG. 5) to the position shown in FIG. 8. It will be noted that the U-shaped frame 68 has completely encircled the hook 112 but that the locking plate 90 is not yet in position. When the latch/loading assembly 22 is moved forward, by means of the cable 44 and winch 42 of the second drive means 40, the U-shaped frame 68 will fully engage the hook 112 and the locking plate 90 will be free to drop behind the hook, as shown in FIG. 9. It will be appreciated that in this position the container 24 is fully and positively secured by the loading assembly 22 and will be controlled thereby until all the operations are completed. This allows for the container 24 to be drawn forwardly up the inclined dumping assembly, as shown in FIG. 2. The freely rotating rollers 38 assist in supporting the container during relative movement along the side rails 28, 30. If it is then desired to transport the container, the dump assembly 18 would be lowered to a conventional transport position and the container hauled to its destination. Should it be desired to unload the container, the dump assembly is raised to the position shown in FIGS. 1 and 2 and the second drive means activated to positively drive the container 22 from the truck 10. It will be appreciated that throughout this maneuver, the driver need not dismount from the cab and there is no reliance on the force of gravity for movement of the container. This being the case, the present invention can also be utilized to offload the container 24 onto a trailer 112 or other elevated loading surface (not shown) such as a loading dock.

Figure 10:
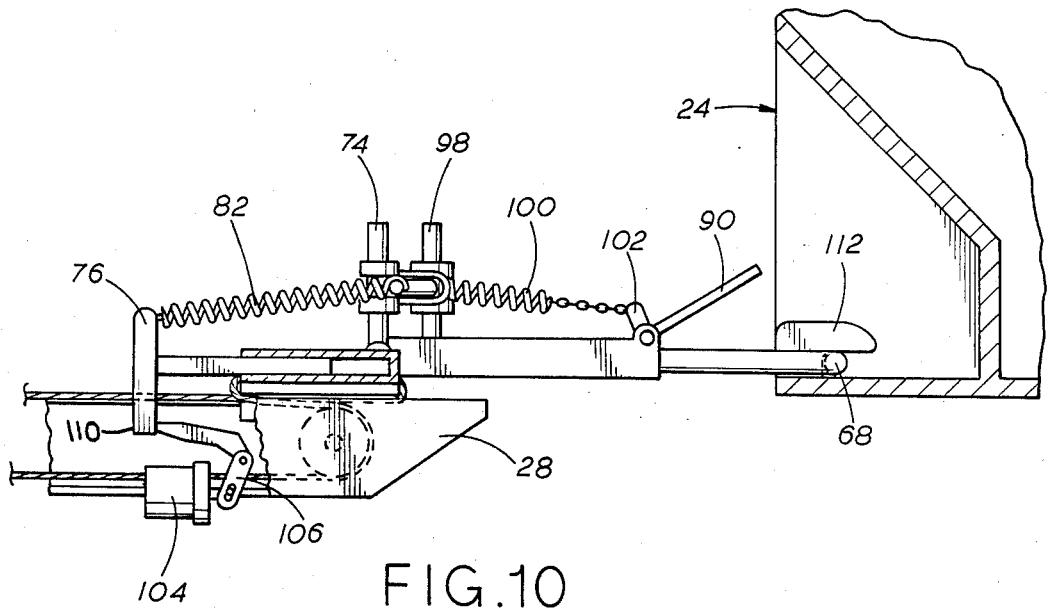
FIG. 10 is a side elevation similar to FIGS. 7–9 showing the latching mechanism at the beginning of an unlatching operation.

When it is desired to unload and detach the container, the piston assembly 104 is actuated to move the linkage arm 108 into position shown in FIG. 10. In this position, the T-shaped actuator 76 will be engaged toward the end of movement of assembly 22 with respect to side rails 28, 30 and commence pulling the spring 82 which will cause crossbar 86 and and stud 98 to rotate. This in turn causes the spring 100 to be tensioned raising the locking plate 90. Continued rearward movement of loading assembly 22 would bring the U-shaped frame into the position shown in FIG. 8, releasing the hook 112 and then into the unlatched condition shown in FIG. 7.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. In combination with a truck having a dump bed on a rear portion of a chassis, a loading means to provide positive control during loading and unloading of cargo containers onto and off of said dump bed, each said cargo container having a fixed latch hook at one end thereof, said loading means comprising:

a fixture adapted to be driven longitudinally of said dump bed;

means for driving said fixture along said dump bed;

a latching assembly carried by said fixture and having a latching plate with one end pivotally mounted on said fixture and a closed U-shaped frame on the other end of said plate, a locking plate pivotally mounted on said latching plate within said U-shaped frame, and actuator means for imparting sequential movement of said locking plate relative to said latching plate and said latching plate relative to said fixture; and an actuating member controlled by the driver to be selectively engaged by said moving fixture whereby said fixture moving rearwardly of said bed causes said latching assembly to move from a raised disengaged position to a lowered engaged position in which the hook of the container is securely received in said U-shaped frame and held therein by said locking plate so that said container can be drawn onto and driven off of said dump bed in a controlled positive manner regardless of the angle of said dump bed with respect to said chassis.

2. The combination according to claim 1 wherein said actuator means comprises:

a first stud fixed to and extending normal to said latching plate, a second stud extending normal to said latching plate and rotatable with respect thereto, a bar carried by said second stud rotatable into engagement with said first stud, an actuator carried by said fixture, first spring means connected between said actuator and said bar and second spring means connected between said bar and said locking plate whereby movement of said actuator causes a first movement of said locking plate followed by a delayed movement of said latching plate.

3. The combination according to claim 2 wherein said actuating member comprises:
drive controlled linkage means movable between first and second positions, in said first position said linkage means serving as an abutment against which said actuator means carried by said fixture engages with continued relative movement of said fixture with respect to said linkage means causing rotation of said latching plate to unlatch said hook, and in said second position said linkage means allowing free movement of said fixture.

4. A truck capable of performing controlled loading and unloading of cargo containers having a fixed hook pin at one end thereof, said truck comprising:
a chassis having a cab on a forward portion and a load carrying rear portion,
a latching fixture carried by and movable along said rear portion,
means to positively drive said latching fixture forwardly and rearwardly with respect to said chassis, and
latching means carried by said latching fixture and comprising a latching plate having one end pivotally attached to said fixture and profiled to engage said hook, a locking plate pivotally attached to said latching plate to engage said hook, actuation means including a fixed and rotatable member each extending from said latching plate, a bar carried by said rotatable member and postioned to rotate against said fixed member, an actuator carried by said fixture, first spring means connected from said bar to said actuator and second spring means connected from said bar to said locking plate, said actuator means cooperating with control means fixed to said load carrying rear portion of said truck whereby said assembly is actuated by relative movement of said fixture on said rear portion to selectively and lockingly engage said hook so that a container can be positively drawn onto and driven off of said load carrying portion regardless of its relative position with respect to the chassis.

5. A truck according to claim 4 wherein said rear portion further comprises:
a dumping assembly formed by a frame, one end of which is pivotally attached to the rear of said chassis, and first drive means connected between said chassis and said frame to raise and lower said frame with respect to said chassis.

6. A truck according to claim 4 wherein said latching fixture is profiled for relative movement along said chassis.

7. A truck according to claim 6 wherein said latching plate is an elongated member having one end rotatably mounted on said fixture and a closed U-shaped frame at the other end.

8. A truck according to claim 7 wherein said fixed member is a first stud extending normal to said plate member.

9. A truck according to claim 7 wherein said rotatable member is a second stud extending normal to said plate member, said second stud being rotatable about its own axis;
said bar connecting said second stud to said first stud for delayed relative movement.

10. A truck according to claim 6 wherein said means to drive said latching fixture comprises:
a winch and cable: and
means to adjustably attach said cable to said fixture.

11. A truck according to claim
wherein said control means is driver actuated and is attached to said chassis and having linkage means movable between first and second positions in which it interferes with or clears, respectively, said actuator means carried by said fixture so that relative movement of said fixture with respect to said linkage means causes said latching means to rotate.

* * * * *